United States Patent
Van Gaalen et al.

(10) Patent No.: US 6,552,134 B1
(45) Date of Patent: Apr. 22, 2003

(54) ISOCYANATE-MODIFIED EPOXY-FUNCTIONAL POLYESTER

(75) Inventors: Ronald Petrus Clemens Van Gaalen, Amsterdam (NL); Petrus Gerardus Kooijmans, Amsterdam (NL); Eric Johannes Vos, Amsterdam (NL)

(73) Assignee: Resolution Performance Products LLC, Houston, TX (US)

(*) Notice: Subject to any disclaimer, the term of this patent is extended or adjusted under 35 U.S.C. 154(b) by 0 days.

(21) Appl. No.: 09/839,312

(22) Filed: Apr. 20, 2001

Related U.S. Application Data

(62) Division of application No. 09/429,791, filed on Oct. 29, 1999, now Pat. No. 6,262,186.

(30) Foreign Application Priority Data

May 11, 1998 (EP) .............................. 98203734

(51) Int. Cl.$^7$ ................. B32B 15/08; B32B 27/36; C08L 67/02; C08L 67/03
(52) U.S. Cl. ................. 525/440; 428/458; 428/480
(58) Field of Search ............... 428/458, 480; 525/440

(56) References Cited

U.S. PATENT DOCUMENTS

| | | | | |
|---|---|---|---|---|
| 6,107,442 A | * | 8/2000 | Freriks et al. | 528/272 |
| 6,143,838 A | * | 11/2000 | Van Gaalen et al. | 525/438 |
| 6,201,073 B1 | * | 3/2001 | Van Gaalen et al. | 525/437 |
| 6,262,186 B1 | * | 7/2001 | Van Gaalen et al. | 525/440 |

FOREIGN PATENT DOCUMENTS

| | | | |
|---|---|---|---|
| EP | 389388 A1 | * | 3/1990 |
| EP | 442583 A1 | * | 8/1991 |
| EP | 634434 A2 | * | 1/1995 |
| EP | 720997 A2 | * | 7/1996 |
| WO | WO 94/04589 A1 | * | 3/1994 |
| WO | WO 98/23661 A1 | * | 11/1997 |
| WO | WO 98/24828 A1 | * | 12/1997 |
| WO | WO 98/37119 A1 | * | 8/1998 |

OTHER PUBLICATIONS

Agawa and Dumain, "New Two–Component Powder Coating Binders: Polyester–Acrylate Hybrid as TGIC Cure Alternative," Waterborne, Higher–Solids, and Powder Coatings Symposium, Feb. 5–7, 1997, New Orleans, LA, pp. 342–353.*

* cited by examiner

*Primary Examiner*—Robert E. L. Sellers

(57) ABSTRACT

Modified epoxy functional polyesters are provided by reacting epihalohydrin in the presence of a base with carboxyl functional polyester resins (II) obtainable by reacting:

(a) at least one aromatic or cycloaliphatic dicarboxylic acid compound A comprising two aromatic- or secondary aliphatic carboxyl groups or the anhydride thereof;

(b) at least one diol compound B comprising two aliphatic hydroxyl groups, which may independently be a primary or a secondary hydroxyl group; and optionally (c) compound C1 comprising one monofunctional primary- or secondary hydroxyl group and/or at least one compound C2 comprising one primary- or secondary hydroxyl group and one tertiary aliphatic carboxyl group; and optionally (d) a dihydroxymonocarboxylic acid compound D comprising a tertiary aliphatic carboxyl group and two aliphatic hydroxyl groups, which may each independently be primary or secondary hydroxyl; and optionally (e) a trihydroxyalkane (E1) or tetrahydroxyalkane (E2), the molar ratio of compounds A:B:C1:C2:D:E1:E2 being $$X+Y+1:X:M:N:Y:Z:Q$$

wherein M+N is in the range of from 0 to 2, X ranges from 2 to 8 and Y ranges from 0 to 8, Z ranges from 0 to 2 and Q ranges from 0 to 2, and subsequently reacting the product of epoxy functional polyester (III) with an isocyanate (IV).

7 Claims, No Drawings

ISOCYANATE-MODIFIED EPOXY-FUNCTIONAL POLYESTER

This is a division of application Ser. No. 09/429,791 filed Oct. 29, 1999, U.S. Pat. No. 6,262,186, the entire disclosure of which is hereby incorporated by reference.

The present invention relates to epoxy functional polyester resins, to a process for their preparation and to outdoor durable powder coating compositions comprising them which have improved storage stability and overall coating properties.

Epoxy functional polyester resins and outdoor durable coatings comprising them, are known from e.g. European patent applications Nos. 0634434A2, 0720997A2 and International applications Nos. WO 98/23661 and WO 98/24828.

European patent application No. 0634434A2 discloses a process for the preparation of linear tertiary aliphatic carboxyl functional polyester resins, by reacting:

(a) at least one compound A' comprising one monofunctional primary- or secondary hydroxyl group and/or at least one compound A" comprising one primary- or secondary hydroxyl group and one tertiary aliphatic carboxyl group;

(b) at least one aromatic or cycloaliphatic dicarboxylic acid compound B comprising two aromatic- or secondary aliphatic carboxyl groups or the anhydride thereof;

(c) at least one diol compound C comprising two aliphatic hydroxyl groups, which may independently be a primary or a secondary hydroxyl group; and (d) at least one dihydroxymonocarboxylic acid compound D comprising a tertiary aliphatic carboxyl group and two aliphatic hydroxyl groups, which may each independently be primary or secondary hydroxyl, the molar ratio of compounds A':A":B:C:D being $$M:N:X+Y+1:X:Y$$

wherein $M+N=2$, X ranges from 2 to 8 and Y ranges from $2-N$ to 8, at a temperature of from 100 to 240° C., until essentially all the non-tertiary carboxyl groups as initially present in the reaction mixture have been reacted. In this application, polyglycidylester resins were obtained by reacting such linear tertiary aliphatic carboxyl functional polyesters with an excess epihalohydrin in the presence of a suitable base and optional catalyst. Preferably, the polyesters were reacted with epichlorohydrin. Both the specified linear polyesters and the corresponding polyglycidylesters derived therefrom were used with a cross-linking agent for powder coating compositions.

In European patent application No. 0720997A2, linear tertiary carboxyl functional polyesters and epoxy functional polyester resins are disclosed where these polyester resins were produced by reacting:

a) at least one aromatic and/or cycloaliphatic carboxylic acid compound A comprising two aromatic- and/or secondary aliphatic carboxyl groups or the anhydride thereof, b) at least one hydroxyl compound B comprising two aliphatic hydroxyl groups, which groups each independently may be primary or secondary hydroxyl groups, c) at least one hydroxyl substituted carboxylic acid compound C comprising at least one tertiary aliphatic carboxyl group and two aliphatic hydroxyl groups, which groups each independently may be primary or secondary hydroxyl groups, and d) optionally one carboxylic acid compound D comprising one carboxyl group, the molar ratio of compounds A:B:C:D being $$(X+Y-1):X:Y:Z,$$

wherein X ranges from 2 to 8, Y ranges from 2 to 8, and Z ranges from 0 to 2.

These polyester resins could be used together with a suitable curing agent for the production of powder coatings, or could be converted into the corresponding glycidylesters, which in combination with a suitable curing agent could be used for the production of powder coatings.

WO 98/24828 describes linear, tertiary carboxyl functional polyester resins obtainable by reaction of (a) at least one 1,4-dicarboxylcyclohexane (A) optionally mixed with a minor weight fraction of an alkane dicarboxylic acid, containing in the range of from 8 to 16 carbon atoms (A'), (b) at least one dihydroxymonocarboxylic acid compound (B), comprising a tertiary aliphatic carboxyl group and two aliphatic hydroxyl groups, (c) optionally one diol compound (C) comprising two aliphatic hydroxyl groups, which may independently be a primary or a secondary hydroxyl group, and optionally (d) a compound (D') comprising one monofunctional primary or secondary hydroxyl group and/or a compound (D") comprising one primary or secondary hydroxyl group and one tertiary aliphatic carboxyl group, the molar ratio of the compounds (A+A'):B:C:D':D" being $X+Y+1:Y:X:M:N$ wherein M+N is the range of from 0 to 2, wherein X ranges from 2 to 8, and Y ranges from [2-(M+N)] to 8, at a temperature of from 100 to 225° C., until essentially all the non-tertiary carboxyl groups as initially present in the reaction mixture have been reacted; polyglycidylesters derived from said polyester resins; and coating compositions comprising at least one polyester resin and/or at least one polyglycidylester resin.

WO 98/23661 describes linear, tertiary carboxyl functional polyester resins obtainable by reaction of a) at least one compound $A_1$, comprising the reaction product of (i) a glycidylester of a mixture of synthetic highly branched saturated monocarboxylic acids isomers of formula ($R_1$) ($R_2$) ($R_3$)C—COOH (I), wherein $R_1$, $R_2$ and $R_3$ are alkyl groups of from 1 to 15 carbon atoms, of which at least one is methyl, each acid containing from 5 to 19 and preferably from 5 to 13 carbon atoms and preferably CARDURA glycidylesters, and (ii) a mixture of said synthetic highly branched saturated monocarboxylic acids, in a molar ratio of 1:1; said component $A_1$ being optionally mixed with hydroxy pivalic acid ($A_2$) and/or hydrogenated diphenylolpropane ($A_3$); b) at least one aromatic or cycloaliphatic dicarboxylic acid compound B, comprising two aromatic- or secondary aliphatic carboxyl groups or the anhydride thereof; optionally c) at least one dihydroxymonocarboxylic acid compound C comprising a tertiary aliphatic carboxyl group and two aliphatic hydroxyl groups, which may each independently be primary or secondary hydroxyl; and d) optionally at least one diol compound D comprising two aliphatic hydroxyl groups which may each independently be a primary or a secondary hydroxyl group; the molar ratio of compounds $A_1:A_2+A_3:B:C:D$ being $A_1:(2-A_1):X+Y+1:X:Y$, wherein $A_1$ ranges from 0.1 to 2, wherein Y ranges from 0 to 6 and X ranges from 2 to 8, at a temperature of from 100 to 225° C., until essentially all the non-tertiary carboxyl groups as initially present in the reaction mixture have been reacted; polyglycidylesters derived from said polyester resins and coating compositions comprising at least one polyester resin and/or at least one polyglycidyl resin.

Although the linear tertiary aliphatic carboxyl functional polyester resins and the polyglycidylesters thereof enabled a certain progress towards the requirements of excellent outdoor durability (UV stability) and resistance against hydrolysis in the cured state, for their use in modern economically applied powder coatings, there is still a need for further improvement of this combination of properties.

On the other hand novel powder coating binders for the exterior durable powder coating market derived from carboxylated polyester resins, cured with epoxy functional acrylate polymers, have been proposed during the Waterborne, Higher Solids and Powder Coatings Symposium, Feb. 5–7, 1997, New Orleans La., USA, T Agawa and E D Dumain, p. 342–353, "New Two-component Powder Coating Binders: Polyester acrylate hybrid as TGIC Cure Alternative.

However, as indicated on page 353, further improvements have to be made to provide smoother films, lower cure temperatures and UV durability to rival that of automotive topcoating or outdoor building panel topcoating.

The epoxy functional polyester resins obtainable according to the hereinbefore discussed documents, although showing attractive combinations coating properties, such as outdoor durability, flexibility, hardness, chemical resistance comprise minor but significant amounts ($\leq 25$ wt %) of side products, which bear terminal hydroxy and/or hydrolyzable halogen (chlorine) and which have appeared to be formed during the incomplete glycidation of the starting carboxyl functional polyester resins.

Due to this minor contents of byproducts in the finally obtained glycidyl esters of carboxyl functional polyester resins, the latter are less reactive as expected, which may be expressed by a lower functionality. Moreover, said side products can cause several uncontrolled side reactions when incorporated in the intended outdoor durable powder coating compositions.

This caused less optimal coating properties of the finally obtained cured coatings and more in particular the outdoor durability, due to the formation of ether linkages in the final coating.

Moreover, the glass transition of these glycidyl esters is too low, resulting in a deteriorated storage stability.

It will be appreciated that there is a need to improve the outdoor durable coating properties further by elimination of the uncontrolled activity of the hydroxy and/or hydrolyzable halogen in the occurring byproducts.

Therefore it is an object of the present invention to provide powder coating compositions, showing improved properties such as storage stability, reactivity and final coating properties such as ODD flexibility, and comprising at least a glycidylester of carboxyl functional polyester resin.

Another object of the present invention is to provide the modified compositions glycidylesters derived from carboxyl functional polyester resins.

Accordingly, the invention relates to modified epoxy functional polyesters (I), produced by reacting epihalohydrin and preferably epichlorohydrin, in the presence of a base, with at least one carboxyl functional polyester resin (II), produced by reacting:
(a) at least one aromatic aliphatic or cycloaliphatic dicarboxylic acid compound A comprising two aromatic- or secondary aliphatic carboxyl groups or the anhydride thereof;
(b) at least one diol compound B comprising two aliphatic hydroxyl groups, which may independently be a primary or a secondary hydroxyl group; and optionally
(c) compound C1 comprising one monofunctional primary- or secondary hydroxyl group and/or at least one compound C2 comprising one primary- or secondary hydroxyl group and one tertiary aliphatic carboxyl group; and optionally
(d) a dihydroxymonocarboxylic acid compound D comprising a tertiary aliphatic carboxyl group and two aliphatic hydroxyl groups, which may each independently be primary or secondary hydroxyl; and optionally
(e) a trihydroxyalkane (E1) or tetrahydroxyalkane (E2), the molar ratio of compounds A:B:C1:C2:D:E1:E2 being

X+Y+1:X:M:N:Y:Z:Q wherein M+N is in the range of from 0 to 2, X ranges from 2 to 8 and Y ranges from 0 to 8, Z ranges from 0 to 2 and Q ranges from 0 to 2 at a temperature of from 100 to 220° C., until a predominant part of the non-tertiary carboxyl groups as initially present in the reaction mixture, i.e. 75% or more, have been converted, and subsequent reaction of said obtained composition of epoxy functional polyester (III) having an EGC in the range of from 500 to 3000 preferably 1000–2500 and a number average molecular weight $M_n$ in the range of from 500 to 10,000, with an isocyanate (IV), in a molar ratio of III:IV such that at least all the present terminal hydroxy groups will be converted. Preferably, when the isocyanate (IV) represents a diisocyanate the molar ratio of III:IV is in the range of from 0.9:1 to 1.2:1 and more preferably from 1.0:1 to 1.1:1.

It has surprisingly been found that such reaction of the epoxy functional polyester resins with an isocyanate leads to advanced epoxy functional polyester resins, which show an increased Tg and improved combinations of properties of coating compositions, in which they have been incorporated.

It will be appreciated that as the isocyanate (IV) component can be used monoisocyanates, diisocyanates and/or polyisocyanates or mixtures thereof. Preferably diisocyanates are used, optionally mixed with monoisocyanate.

It will be appreciated that the present invention also relates to improved powder coating compositions, wherein the modified epoxy functional resin component is formed in situ in a premixture of the unmodified epoxy resin and a stable isocyanate or optionally a blocked isocyanate, e.g. in an extruded premix.

An optionally applied blocked isocyanate will deblock at higher temperatures to form a free active isocyanate.

As starting epoxy functional polyester resins (III) for said reaction with e.g. diisocyanate can be used a great variety of epoxy functional polyesters, having a straight or branched structure. Preferably epoxy functional polyesters are used, having a number average molecular weight of from 700 to 1500.

According to a more preferred embodiment the starting epoxy functional polyester resins to be advanced according to the present invention, have been derived from carboxyl functional polyester resins produced by reacting:

a) at least one compound of the formula

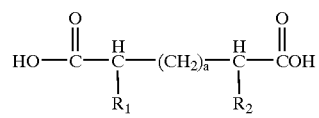

wherein a $\geq 1$ wherein $R_1$ and $R_2$ each may represent an alkyl group having from 1 to 4 carbon atoms, or wherein $R_1$ and $R_2$ may form together with the group

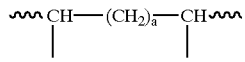

a cycloalkyl group, which preferably represents 1,4-cyclohexane dicarboxylic acid (A1), optionally mixed with minor amounts of a corresponding compound of formula V, wherein a=0 or anhydride thereof (A2), b) at least one diol compound B comprising two aliphatic hydroxyl groups which may each independently be a primary or a secondary hydroxyl group;

c) optionally a dihydroxymonocarboxylic acid compound C, comprising a tertiary aliphatic carboxyl group and two aliphatic hydroxyl groups, which may each independently be primary or secondary hydroxyl; and d) optionally a trihydroxyalkane (E1) or tetrahydroxyalkane (E2), the molar ratio of compounds $(A_1+A_2):B:C:E1:E2$ being X+Y+2Z+3Q+P:X:Y:Z:Q, wherein X ranges from 1 to 8, Y ranges from 0 to 8, Z ranges from 0 to 1 and Q ranges from 0 to 1 and wherein P ranges from 1 to 5, and preferably 1–3 and is most preferably equal to 1, at a temperature of from 100 to 220° C., and preferably from 180 to 210° C. if any compound C is present, until essentially all the hydroxyl groups as initially present in the reaction mixture have been reacted.

With the term "minor amounts" as used the optional component A2 are meant amounts of from 0 to 10 mole %, relative to the total molar amount of A1 and A2.

Preferably carboxyl functional polyester resins are aimed at wherein Y>0 if Z+Q=0, or wherein Z+Q>0 if Y=0.

The process for preparation of the starting carboxyl functional polyesters, from which the initial epoxy functional polyesters to be reacted subsequently with diisocyanate, can in general be carried out according to conventional esterification methods and preferably by azeotropic condensation, taking care that the terminal secondary carboxyl groups are only originating from 1,4-cyclohexane dicarboxylic acid. In particular, the condensation is carried out by charging the compounds A, B, optionally C and optionally D1 or D2, simultaneously to the reactor whereafter the temperature is increased from room temperature to a temperature in the range of from 180 to 220° C., preferably from 180 to 210° C. in the presence of any compound B, during a period of 3 to 8 hours, thus allowing the reaction to initiate and to proceed under continuous azeotropic removal of water. Generally the azeotropic removal of water is being continued until at least 90% of the original hydroxyl groups have reached and more preferably at least 95% of the original hydroxyl groups have reacted. An esterification catalyst known in the art, such as for example dibutyltinoxide, paratoluenesulphonic acid, tinoctoate, zincoctoate and lithium ricinoleate may be used in the esterification process, but is in general not required.

In order to be sure that the terminal secondary carboxyl groups have originated from the structure of formula V dicarboxylic acid wherein a≧1, and in particular 1,4-cyclohexane dicarboxylic acid, and not from the corresponding 1,2-structure (a=0) and in particular 1,2-dicyclohexane dicarboxylic acid, a part of the total batch of e.g. 1,4-cyclohexane dicarboxylic acid to be included, may be added during the reaction and more preferably in its last stage.

Suitable compounds A for use in the process of the present invention are for example phthalic acid (PA), tetrahydrophthalic acid, hexahydrophthalic acid (HHPA), methylhexahydrophthalic acid, endomethylenetetrahydrophthalic acid, methyl endomethylenetetrahydrophthalic acid, 1,4-cyclohexanedicarboxylic acid (1,4-CHCA) and 1,3-cyclohexanedicarboxylic acid or combinations thereof; whereof 1,4-cyclohexanedicarboxylic acid is particularly preferred.

Suitable compounds B for use in the preparation of the starting carboxy functional polyesters include branched aliphatic-, cycloaliphatic-, or araliphatic compounds, containing two aliphatic hydroxyl groups, each individually being either a primary or a secondary hydroxyl group, such as for example propylene glycol, neopentyl glycol, hydrogenated diphenylolpropane (HDPP), hydrogenated 4,4'-dihydroxydiphenyl, 1,4-cyclohexanedimethylol, 1,4-dihydroxycyclohexane, hydroxypivalylhydroxy-pivalate and 2-butyl-2-ethyl-1,3-propanediol or mixtures thereof; of which HDPP is particularly preferred.

Typical examples of a suitable compound C1 for the preparation of starting carboxy functional polyesters are aliphatic alcohols and cycloaliphatic alcohols, having primary or one secondary hydroxyl group and having from 1 to 6 carbon atoms such as neopentanol, 2-butanol, cyclohexanol, or a 1:1 adduct of a VERSATIC acid and a glycidylester of a VERSATIC acid, having from 5 to 13 carbon atoms.

Suitable compounds C2 are aliphatic and cycloaliphatic alcohols having one primary or one secondary hydroxyl group and having of from 1 to 6 carbon atoms and in addition one tertiary aliphatic carboxyl group, such as 1-methyl-4-hydroxycyclohexane-1-carboxylic acid, hydroxypivalic acid.

A typical example of a suitable compound D for use in the preparation of starting carboxy functional polyester is dimethylol propionic acid (DMPA).

A typical and preferred example of compound E, if any, is used for the preparation of the starting branched glycidyl functional polyesters, to be used for the process of the present invention, is trimethylol propane and a preferred example of compound E2 if any is used, is pentaerythritol.

It will be appreciated that the starting glycidyl functional polyester resins can be obtained by easy conversion of a precursor carboxy functional polyester resin with an excess epihalohydrin, in the presence of a suitable base and optionally a catalyst. Most conveniently epichlorohydrin is used.

It was found that those polyglycidyl ester resins to be used as starting material (III) for the preparation of epoxy functional polyester resins of the present invention, are preferred, which have been derived from carboxyl functional polyester resins (II), wherein Y ranges from 1 to 4, X simultaneously ranges from 1 to 6, Z ranges from 0 to 1 and Q ranges from 0 to 1, can provide the more preferred outdoor durable powder coating compositions. Most preferably polyglycidyl ester resins are used, wherein X ranges from 1 to 4, Y ranges from 1 to 2, Z=0, Q=0.

Suitable isocyanates which can be used for the direct in-situ conversion of epoxy functional polyester resins, can be selected from toluene diisocyanate; 1-naphthyl isocyanate, 4-methoxyphenyl isocyanate, cyclohexyl isocyanate, ethyl isocyanate, isobutylisocyanate, isopropyl isocyanate, methoxymethyl isocyanate, phenyl isocyanate, 4,4'-diphenylmethane diisocyanate; hexamethylene diisocyanate, 1,12-diisocyanatododecane; isophorone diisocyanate; 4,4'-dicyclohexylmethale diisocyanate, 1,4-cyclohexane diisocyanate.

Preferred diisocyanates are toluene diisocyanate; hexamethylene diisocyanate, 1,12-diisocyanatododecane; isophorone diisocyanate and 4,4'-dicyclohexylmethane diisocyanate, of which 4,4'-dicyclohexyl methane diisocyanate and 1,4-cyclohexane diisocyanate are most preferred.

Examples of blocked diisocyanates cross-linking component include those which are based on isophorone diisocyanate blocked with ε-caprolactam such as described in U.S. Pat. Nos. 3,822,240, 4,150,211 and 4,212,962.

The reaction between the diisocyanate and the epoxy functional polyester resin usually takes place at temperatures in the range of from ambient temperature to 180° C. and preferably from 20° C. to 160° C.

The reaction can be carried out in a solvent selected from a variety of polar solvents, such as ketones, ethers, esters, of which the ketones are preferred. A more preferred solvent is methyl isobutyl ketone. However, it will be appreciated that the reaction can also be carried out in principle as a mass reaction e.g. in an extruder.

The curable outdoor durable powder coating compositions, forming another aspect of the present invention, may be prepared by addition of a cross-linking resin to the hereinbefore specified modified polyglycidyl ester resin (I).

As cross-linking resin a precursor carboxy functional polyester resin (II) from which the intermediate initially prepared polyglycidyl ester (III) can be derived by glycidation, can be used. Preferably said precursor has a polyester chain microstructure which is rather similar to that of the final polyglycidylester.

The amount of cross-linking compound used in the powder coating compositions of the invention will normally be such so as to provide about equal amounts of reactive groups of the cross-linking compound and the epoxy groups present in the advanced polyglycidyl ester resin.

However, other suitable cross-linking resins can also be used in combination with the advanced polyglycidyl ester resins of the present invention, such as solid polyacids such as sebacic acid, 1,12-dodecanedioic acid; anhydrides such as polyazeleic polyanhydride; acid functional polyesters such as the reaction product of one mole of trimethylolpropane and 3 moles of hexahydrophthalic anhydride, the reaction product of 1,6-hexanediol with a molar excess of 1,12-dodecanedioic acid, the reaction product of 4 moles 1,10-decanedicarboxylic acid, 1.49 mols hexanediol, 0.47 mols 1,1,1-tris-(hydroxymethyl)-propane and 0.27 mols pentaerythritol, the reaction product of 4 mols 1,10-decanedicarboxylic acid, 1.2 mols hexanediol, 0.45 mols trimethylolpropane, 0.29 mols pentaerythritol and 0.21 mols dimethylolpropionic acid and the reaction product of one mole of hexamethoxymethylmelamine and 3 moles of hydroxypivalic acid and amine-type curing agents.

The powder coating compositions of the present invention may further comprise a catalyst and optionally other additives, as known in the art to be suitable for use in powder coating compositions.

Suitable catalysts are for example quaternary ammonium and phosphonium salts; metal salts/compounds such as for example stannous(II)octoate; basic compounds such as for example the imidazoles; and tertiary amines such as for example diazabicycloundecene.

The amount of catalyst used will usually be somewhere in the range of from 0.01 to 2% by weight based on the weight of the total powder coating composition.

Suitable cure times and cure temperatures of the powder coating compositions of the invention are those conventionally applied in connection with powder coating systems.

It will be appreciated that another aspect of the present invention is formed by formed substrates coated with a curable outdoor durable powder coating composition as specified hereinbefore, in cured or uncured state.

EXAMPLES

The invention is illustrated by the following examples, however without restricting its scope to these specific embodiments.

Example 1

Preparation of aliphatic carboxyl functional polyesters P1 to P6 according to invention.

Compounds A1 to D1 were charged in molar amounts as indicated in Table 1 in around bottom glass reactor, equipped with a condenser, temperature control, nitrogen inlet, stirrer and vacuum inlet. The mixture was then heated to 150° C. in 30 minutes. The temperature of the reaction mixture was increased in two hours to 210° C. and kept at 210° C. until at least 94% of the original hydroxyl groups have reacted. The acid functional polyester thus formed was discharged and allowed to cool down to room temperature.

TABLE 1 [1)] [2)]

| Polyester resin code | | Carboxyl functional polyesters | | | | | |
|---|---|---|---|---|---|---|---|
| | | P1 | P2 | P3 | P4 | P5 | P6 |
| 1,4-CHCA | A1 | 5.5 | 9 | 9 | 4.5 | 3 | 6 |
| DMPA | C | 1.5 | 2.5 | 2 | 1 | — | — |
| HDPP | B1 | 3 | 5.5 | 6 | 2 | 1.5 | 1 |
| TMP | D1 | — | — | — | — | — | 1 |
| 1,4-DMCH | B2 | — | — | — | — | — | 2 |

[1)]Numbers given represent the amount of moles of a particular compound charged to the reactor in the process of example 1 for the preparation of the tertiary and partly secondary carboxyl functional polyester resins P1 to P6.
[2)]The chemical compounds represented by the abbreviations used are:
1,4-CHCA: 1.4-cyclohexanedicarboxylic acid
DMPA: dimethylolpropionic acid
HDPP: hydrogenated diphenylolpropane
TMP: trimethylol propane
1,4-DCMH: 1,4-dimethylolcyclohexane

Example 2

Preparation of corresponding glycidylester resins EP1 to EP4. An amount equalling 1 carboxyl group equivalent of linear tertiary and partly secondary aliphatic carboxyl functional polyester resins obtained as examples P1 to P5 in Table 1, was dissolved in 16 moles epichlorohydrin (ECH), 15.5 moles isopropylalcohol (IPA) and 15.5 moles of demi-water. The solution was charged to a glass-reactor equipped with a temperature control, stirrer and reflux condenser. Next, the temperature was raised to 70° C., followed by gradual addition of an 50%wt aqueous solution of 0.16 moles of NaOH over a period of 20 min. The temperature is increased during this caustic addition from 70 to 80° C. At this temperature the mixture is stirred until virtually all acid groups are converted (approx. 50 min.) Subsequently, the mixture is cooled to 55° C. At this temperature, gradual addition of an 50%wt aqueous solution of 0.92 moles of NaOH over a period of 60 min. followed. After a post-reaction of 5 min., 15 moles of water was added and the mixture was stirred for 5 min. The reactor content was allowed to settle and subsequently the brine was separated from the organic phase. The excess of ECH, the IPA and some remaining water was flashed off with vacuum.

The resulting crude resin EP1, EP2, EP3 and EP4 was dissolved in methyl isobutyl ketone (MIBK) (MIBK/Resin=

5/1 v/v) and washed 4 times with water (water/resin=1/1 v/v) at 70–75° C. The MIBK is removed by vacuum flash and the polyglycidylester was discharged from the reactor and allowed to cool down.

The epoxy resins obtained showed the following properties.

TABLE 2

Epoxy functional polyesters

| Epoxy Polyester resin code | EP1 | EP2 | EP3 | EP4 |
|---|---|---|---|---|
| EGC [mmol/kg] | 1400 | 1360 | 1214 | 1657 |
| Hydroxyl content [mmol/kg], Calculated. | 300–600 | 400–600 | 300–500 | 100–300 |
| Melt viscosity [1] at 200° C. [Poise] | 9 | 9 | 11 | 4 |
| $T_g$ [2] [° C.] | 32 | 35 | 39 | 20 |

[1] Determined on ICI cone and plate apparatus.
[2] DSC, second scan, midpoint value.

Example 3

Preparation of corresponding modified polyglycidylester resins MEP1, MEP2, MEP3 and MEP4.

Compounds EP1, EP2 and EP3 were charged in weight amounts as indicated in Table 3 in around bottom glass reactor, equipped with a condenser, temperature control, nitrogen inlet, stirrer and vacuum inlet.

The epoxy polyester was dissolved in methyl isobutyl keton (MIBK), Resin/MIBK=1/5 v/v. Subsequently a weight amount of coupling agent, as indicated in Table 3 was added. The mixture was then heated to 90° C. in 30 minutes and hold at 90° C. until virtually all OCN groups are converted (approx. 60–180 min.). Subsequently, the MIBK is removed by vacuum flash and the modified polyglycidylester was discharged from the reactor and allowed to cool down.

The modified epoxy resins obtained showed the following properties.

TABLE 3[1]

Modified epoxy functional polyesters

| | | MEP1 | MEP2 | MEP3 | MEP4 | MEP5 | MEP6 |
|---|---|---|---|---|---|---|---|
| Epoxy functional polyester resin[2]: | EP1 | 96 | 94 | — | — | 95 | — |
| | EP2 | — | — | 96 | — | — | — |
| | EP4 | — | — | — | 96 | — | 92 |
| Coupling agent: | HMDI[3] | 4 | 6 | 4 | 4 | — | — |
| Carboxyl functional polyester[4]: | P5 | — | — | — | — | 5 | 8 |
| EGC [mmol/kg] | | 1327 | 1300 | 1308 | 1580 | 1280 | 1252 |
| Hydroxyl content [mmol/kg], Calculated | | <300 | <150 | <300 | <100 | 400–700 | 300–500 |
| Melt viscosity[5] at 200° C. [Poise] | | 29 | 41 | 32 | 30 | 15 | 16 |
| $T_g$[6] [° C.] | | 47 | 51 | 50 | 55 | 39 | 45 |

[1] Epoxy functional polyester resin: EP1, EP2 and EP4 and coupling agents HMDI (4,4'-cyclohexylmethane Diisocyanate) and carboxyl functional polyester P5 are expressed in a w/w ratio.
[2] Prepared as described in example 2, Table 2.
[3] HMDI is 4,4'-cycloHexylMethane DiIsocyanate.
[4] Prepared as described in example 1, Table 1.
[5] Determined on ICI cone and plate apparatus.
[6] DSC, second scan, midpoint value.

TABLE 4

White pigmented binder and coating properties

| Ingredients* | | BC1 | BC2 | BC3 | BC4 | BC5 | BC6 |
|---|---|---|---|---|---|---|---|
| Epoxy polyester resin (1) | EP1 | — | — | — | — | 885 | — |
| " | EP2 | — | — | — | — | — | 895 |
| " | EP4 | — | — | — | — | — | 823 |
| Modified epoxy polyester (2) | MEP1 | 904 | — | — | — | — | — |
| " | MEP3 | — | 909 | — | — | — | — |
| " | MEP4 | — | — | 840 | — | — | — |
| Carboxyl functional resin (3) | | 6 | 596 | 589 | 660 | 615 | 605 | 677 |
| Titaniumdioxide | | 900 | 900 | 900 | 900 | 900 | 900 |
| Modaflow (4) | | 36 | 36 | 36 | 36 | 36 | 36 |
| Benzoin | | 12 | 12 | 12 | 12 | 12 | 12 |
| Catalyst | | 4.5 | 4.5 | 4.5 | 4.5 | 4.5 | 4.5 |
| Powder characteristics | | | | | | | |
| Extrusion behaviour | | ←--------good--------→ | | | | | |
| Storage stability at 40° C. (5) | | good | good | good | poor | poor | poor |

TABLE 4-continued

White pigmented binder and coating properties

|  | BC1 | BC2 | BC3 | BC4 | BC5 | BC6 |
|---|---|---|---|---|---|---|
| Coatings (6) | | | | | | |
| Gloss (7) | 89 | 85 | 86 | 87 | 85 | 82 |
| Reverse Impact (8) | >60 | >60 | >40 | >40 | >60 | >20 |
| Accelerated weather resistance (9) | >2700 | >2100 | >2100 | 2400 | 1800 | 1800 |

*all amounts in grams
(1) Prepared as described in example 2.
(2) Prepared as described in example 3.
(3) Prepared as described in example 1.
(4) MODAFLOW III is an acrylic based flow aid available from Monsanto Co.
(5) Physical storage stability, assessment of the tendency to block. Ranking: poor, moderate and good.
(6) Coatings: Q-panel AL-36, cured at 200° C. for 15 minutes and thickness 40–60 micrometres.
(7) Measured with Gardner micro-TRI-gloss apparatus, angle 60°.
(8) Measured in inch/pounds according to Ericksen type 304 ISO-TR-6272/1979-DIN-55669.
(9) Hours in Atlas Weather-OMeter, running SAE J1960 test method before 50% reduction in gloss.

We claim:

1. A modified epoxy functional polyester produced by reacting epihalohydrin in the presence of a base, with at least one carboxyl functional polyester resin (II) produced by reacting:
    (a) at least one aromatic, aliphatic or cycloaliphatic dicarboxylic acid A comprising two aromatic or secondary aliphatic carboxyl groups; or the anhydride thereof;
    (b) at least one diol compound B comprising two aliphatic hydroxyl groups, which are independently a primary or a secondary hydroxyl group; optionally,
    (c) compound C1 comprising one monofunctional primary or secondary hydroxyl group and/or at least one compound C2 comprising one primary or secondary hydroxyl group and one tertiary aliphatic carboxyl group; optionally
    (d) a dihydroxymonocarboxylic acid D comprising a tertiary aliphatic carboxyl group and two aliphatic hydroxyl groups, which each independently are a primary or secondary hydroxyl; and optionally,
    (e) a trihydroxyalkane (E1) or tetrahydroxyalkane (E2), the molar ratio of compounds A:B:C1:C2:D:E1:E2 being (X+Y+1):X:M:N:Y:Z:Q wherein M+N is in the range of from 0 to 2, X ranges from 2 to 8 and Y ranges from 0 to 8, Z ranges from 0 to 2 and Q ranges from 0 to 2, at a temperature of from 100 to 220° C. until a predominant part of the non-tertiary carboxyl groups initially present in the reaction mixture have been reacted, thereby producing an epoxy-functional polyester (III) having an epoxy group content of from 500 to 3000 and a number average molecular weight $M_n$ of from 500 to 10,000, and subsequently reacting said epoxy functional polyester (III) with an isocyanate (IV), in a molar ratio of III:IV such that at least all the present terminal hydroxyl groups are reacted.

2. The modified epoxy functional polyester of claim 1 wherein the molar ratio between the starting epoxy functional polyester resin (II) and the isocyanate (IV) is in the range of from 0.9:1 to 1.2:1.

3. The modified epoxy functional polyester of claim 1 wherein the starting epoxy functional polyester (III) has a number average molecular weight of from 700 to 1500.

4. The modified epoxy functional polyester of claim 1 wherein as starting epoxy functional polyester resin (III) is used that which has been derived from carboxyl functional polyester resins produced by reacting:
    a) at least one compound of the formula

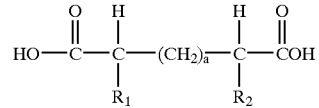

wherein $a \geq 1$
    wherein $R_1$ and $R_2$ each represents an alkyl group having from 1 to 4 carbon atoms, or wherein $R_1$ and $R_2$ may form together with the group

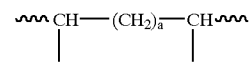

a cycloalkyl group (A1), optionally mixed with minor amounts of a corresponding compound of formula V, wherein a=0 or anhydride thereof (A2),
    b) at least one diol compound B comprising two aliphatic hydroxyl groups which each independently is a primary or a secondary hydroxyl group;
    c) optionally, a dihydroxymonocarboxylic acid compound C, comprising a tertiary aliphatic carboxyl group and two aliphatic hydroxyl groups, which each independently is a primary or secondary hydroxyl; and
    d) optionally, a trihydroxyalkane (E1) or tetrahydroxyalkane (E2),
    the molar ratio of compounds $(A_1+A_2)$:B:C:E1:E2 being (X+Y+2Z+3Q+P):X:Y:Z:Q, wherein X ranges from 1 to 8, Y ranges from 0 to 8, Z ranges from 0 to 1 and Q ranges from 0 to 1 and wherein P ranges from 1 to 5, at a temperature of from 100 to 220° C., and, until essentially all of the hydroxyl groups initially present in the reaction mixture have been reacted.

5. The modified epoxy functional polyester of claim 4 wherein the preceding carboxyl functional polyester resin has the value Y>0 if Z+Q=0 or Z+Q>0 if Y=0.

6. The modified epoxy functional polyester of claim 1 wherein the polyglycidyl ester (III) used as starting material, is derived from a carboxyl functional polyester resin (II), wherein Y ranges from 1 to 2, X simultaneously ranges from 1 to 4 a=0 and Q=0.

7. The modified epoxy functional polyester of claim 1 wherein the isocyanate is selected from the group consisting of toluene diisocyanate; hexamethylene diisocyanate; 1,12-diisocyanato dodecene; isophorone diisocyanate and 4,4'-dicyclohexylmethane diisocyanate.

* * * * *